(12) United States Patent
Schulte et al.

(10) Patent No.: US 11,442,143 B2
(45) Date of Patent: Sep. 13, 2022

(54) RADAR DEVICE WITH A SHIELD

(71) Applicant: Hella GmbH & Co. KGaA, Lippstadt (DE)

(72) Inventors: Michael Schulte, Paderborn (DE); Ralf Krömer, Lippetal (DE); Benjamin Pleuger, Werl (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 541 days.

(21) Appl. No.: 16/334,662

(22) PCT Filed: Oct. 6, 2017

(86) PCT No.: PCT/EP2017/075507
§ 371 (c)(1),
(2) Date: Mar. 19, 2019

(87) PCT Pub. No.: WO2018/069184
PCT Pub. Date: Apr. 19, 2018

(65) Prior Publication Data
US 2021/0286047 A1    Sep. 16, 2021

(30) Foreign Application Priority Data

Oct. 13, 2016 (DE) ..................... 10 2016 119 544.8

(51) Int. Cl.
*G01S 7/03* (2006.01)
*G01S 7/02* (2006.01)
(Continued)

(52) U.S. Cl.
CPC .............. *G01S 7/032* (2013.01); *G01S 7/028* (2021.05); *G01S 13/931* (2013.01);
(Continued)

(58) Field of Classification Search
CPC ........ G01S 7/032; G01S 7/028; G01S 13/931; H01Q 1/42; H01Q 1/08; H01Q 1/3233
See application file for complete search history.

(56) References Cited

U.S. PATENT DOCUMENTS

2009/0135043 A1* 5/2009 Leblanc ................. G01S 13/00
342/100
2013/0058044 A1* 3/2013 Watanabe .......... H05K 7/20854
361/714
(Continued)

FOREIGN PATENT DOCUMENTS

DE    102012111184 A1    5/2014
DE    102013104147 A1    10/2014
(Continued)

OTHER PUBLICATIONS

WO 2018/069184 A2, published Apr. 19, 2018, International Search and Written Opinion dated Apr. 6, 2018 from correspondsin PCT Application PCT/EP2017/075507, filed Oct. 6, 2017.

*Primary Examiner* — Thomas M Hammond, III
(74) *Attorney, Agent, or Firm* — Husch Blackwell LLP

(57) ABSTRACT

A radar device with a housing, with a shield, with an interconnect device, with an electronic circuit arrangement, and with antennas. The shield and the interconnect device, with components and antennas arranged on it, are surrounded by the housing. A medium is arranged between the shield and the housing, and this medium has a thermal conductivity greater than 0.15 W/(m·K).

15 Claims, 4 Drawing Sheets

(51) Int. Cl.
*H01Q 1/42* (2006.01)
*H01Q 1/32* (2006.01)
*G01S 13/931* (2020.01)
*H01Q 21/08* (2006.01)

(52) U.S. Cl.
CPC ............ *H01Q 1/3233* (2013.01); *H01Q 1/42* (2013.01); *H01Q 21/08* (2013.01)

(56) References Cited

U.S. PATENT DOCUMENTS

| | | | |
|---|---|---|---|
| 2016/0218420 A1* | 7/2016 | Leung | G01S 13/931 |
| 2016/0274216 A1* | 9/2016 | Minami | G01S 13/931 |
| 2017/0201162 A1* | 7/2017 | Inokuchi | H02K 11/33 |
| | | | 310/52 |
| 2017/0336503 A1* | 11/2017 | Hammerschnidt | G01S 13/58 |
| | | | 342/104 |
| 2019/0027720 A1* | 1/2019 | Rejman | H01M 2/1077 |
| | | | 429/100 |

FOREIGN PATENT DOCUMENTS

| | | |
|---|---|---|
| DE | 102015200943 A1 | 7/2016 |
| EP | 2189765 A1 | 5/2010 |
| WO | 2011003647 A1 | 1/2011 |

* cited by examiner ically for its design and/or its operation.
RADAR DEVICE WITH A SHIELD

CROSS REFERENCE

This application claims priority to PCT Application No. PCT/EP2017/075507, filed Oct. 6, 2017, which itself claims priority to German Patent Application 10 2016 119544.8, filed Oct. 13, 2016, the entirety of both of which are hereby incorporated by reference.

FIELD OF THE INVENTION

The invention concerns a radar device with a multi-piece housing, with a shield, with an interconnect device, with an electronic circuit arrangement and with antennas, where the shield and the interconnect device with the components and antennas arranged on it are surrounded by the housing.

BACKGROUND

A radar device of this type can found in the document DE 10 2013 104 147 A1. The shield of this radar device is fastened to a lower part of the housing using screws. Using this type of fastening may cause a gap between the shield structure and the housing. This gap is disadvantageous to the heat transfer from the shield structure, which is arranged inside and enclosed by the housing, to the housing itself. However, the transfer of heat out of the housing is particularly important for the electronic circuit arrangement, particularly for its design and/or its operation.

SUMMARY OF THE INVENTION

Therefore, the object of this invention is to improve the heat transfer out of the housing interior.

This object is achieved in accordance with invention specifications by arranging a medium between the shield and the housing that has a thermal conductivity greater than 0.15 W/(m·K). The medium fills the gap between the shield and the housing, which improves the heat transfer from the housing interior to the housing.

For a radar device as defined by the invention, it is preferable for the shield to be connected to the housing by gluing, welding or some other firmly bonded connection. The medium can be an adhesive, and the bond between the shield and the housing can be established by an adhesive. In this case, the medium provides not only for improved heat transfer from the housing interior to the housing, but also for fastening the shield to the housing. The adhesive can be used to connect the shield to the housing over the entire surface or at selected points.

The adhesive can be a thermally conductive adhesive. A thermally conductive adhesive, also called thermal adhesive, is usually a two-component adhesive, usually epoxy-based or silicone-based. The thermal conductivity of these adhesives is enabled by one or more ceramic or metallic filler materials (zinc oxide, aluminum, copper, graphite, silver, aluminum oxide, aluminum nitride).

The shield of a radar device as defined by the invention can make contact with both the housing and other components of the radar device, such as an absorbing body, through the medium. As a result, the heat transfer from the absorbing body, which is also arranged in the housing interior, to the housing can be improved by the shield structure and/or by the direct connection to the housing.

A part of the housing of a radar device as defined by the invention that makes contact with the shield structure through the medium can be manufactured entirely or partially of plastic, where the plastic contains a material, such as a metal or metallic particles, that has a thermal conductivity greater than the thermal conductivity of other materials contained in the plastic. The part of the housing can be a monolithic part or a section or area of a monolithic plastic part, for example, of a 2-component part. If it is a monolithic part, it can, for example, be a lower part of the housing.

The housing can have cooling fins.

The shield structure as defined by the invention can be a plastic part with external metalization, with a metal core and/or with embedded particles, such as metal particles, with a thermal conductivity greater than that of the plastic, or a metal body, in particular an aluminum body. The aluminum body can be manufactured with a die casting method.

The transfer of heat from the housing interior to the housing can also be improved compared to the current state of technology when the radar device has a monolith that simultaneously forms both the housing or part of the housing and the shield structure. This solution achieves a particularly good thermally conductive connection between the shield structure and the housing. The monolith can be a plastic part with metalization that faces the housing interior, with a metal core and/or with embedded particles, such as metal particles, with a thermal conductivity greater than that of the plastic.

The circuit arrangement of a radar device as defined by the invention can have electronic components, where at least some of the electronic components are arranged on a first side of the interconnect device and the antennas are arranged on a second side of the interconnect device.

The shield of a radar device as defined by the invention can have at least one hole into which at least one of the first components arranged on the first side of the interconnect device protrudes or through which at least one of the components arranged on the first side of the interconnect device protrudes, while the remaining components arranged on the first side of the interconnect device, with the exception of connecting elements, are arranged entirely between the first side of the interconnect device and the shield.

The hole makes it possible to reduce the distance between one side of the shield facing the first side of the interconnect device and the first side of the interconnect device on which components of the circuit arrangement have been arranged. In this case, the first component, whose height exceeds the distance, protrudes into the hole or through the hole. It is possible for multiple first components to protrude into a hole or through a hole. It is also possible for one hole to be provided for each of multiple first components.

It is preferable that the hole or holes have a clear area that corresponds to or is similar to the cross-section of the first component(s).

The first component(s) can at least partially touch the edge of the hole or holes and/or at least partially be at a distance from the edge. The distance can be a maximum of 3 mm, but it is typically about 1.5 mm. The distance should be as short as possible so as not to jeopardize the shielding effect of the shield. On the other hand, a circumferential gap should be provided so that the first component(s) can be inserted into the hole(s). This circumferential gap can offset part and position tolerances.

The first component can have a housing made of metal or at least partially made of metal. The metal of the housing of the first component can supplement the shield, which is interrupted by the hole, and thus improve the shielding. It is preferable to have an electrically conductive connection between the metal of the housing of the first component and the shield. The metal can also be connected to the ground potential of the radar device. It is preferable for this electrically conductive connection to be established through the ground potential of the printed circuit board. It is preferable for the electrically conductive connection between the housing of the first component and the interconnect device to be established through a soldered connection to the ground potential of the interconnect device. It is preferable for the electrically conductive connection between the shield and interconnect device to be established by screwing together the interconnect device and the shield.

In the case of an inventive radar device, the circuit arrangement can have multiple first components.

In the case of an inventive radar device, the shield can have multiple holes.

If an inventive radar device has a shield with multiple holes and a circuit arrangement with multiple first components, then each first component may protrude into one of the holes or through one of the holes.

In the case of an inventive radar device, however, it is also possible for some first components to protrude together into the hole or into one of the holes of the shield or to protrude through the hole or through one of the holes of the shield.

The first component can be a capacitor, in particular an electrolytic capacitor. If multiple first components are present, at least some of these first components can be capacitors, in particular electrolytic capacitors. If the circuit arrangement includes a monolithic microwave integrated circuit (MMIC), it is advantageous if this is not a first component. On the other hand, an MIMIC is advantageous if it is one of the remaining components arranged on the first side of the interconnect device.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
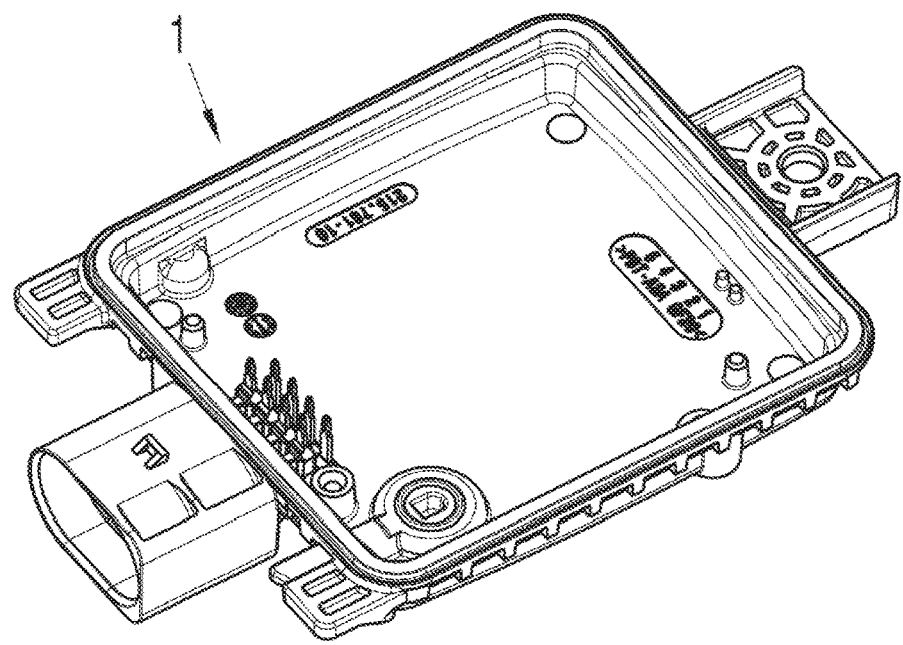
FIG. 1 is a lower part of the housing for an inventive radar device.
Figure 2:
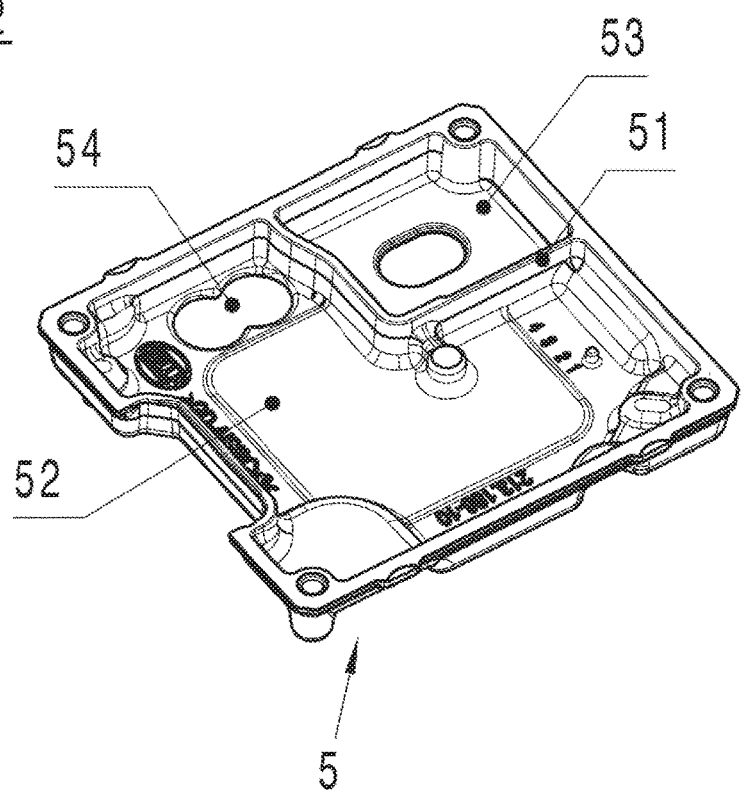
FIG. 2 is a shield for the radar device.
Figure 3:
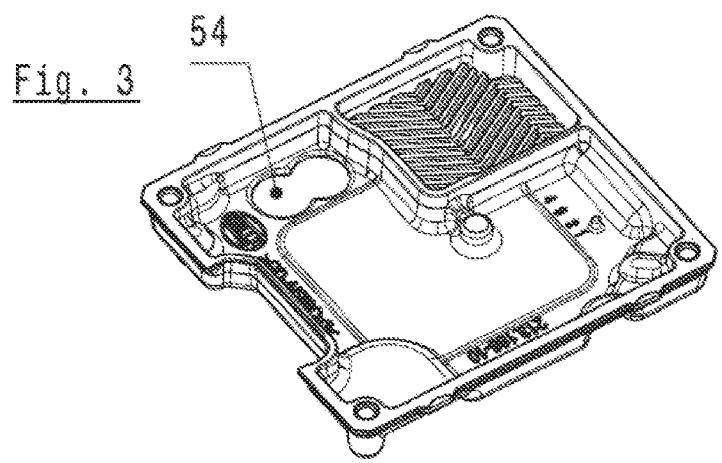
FIG. 3 illustrates the shield and an absorbing body for the radar device.
Figure 4:
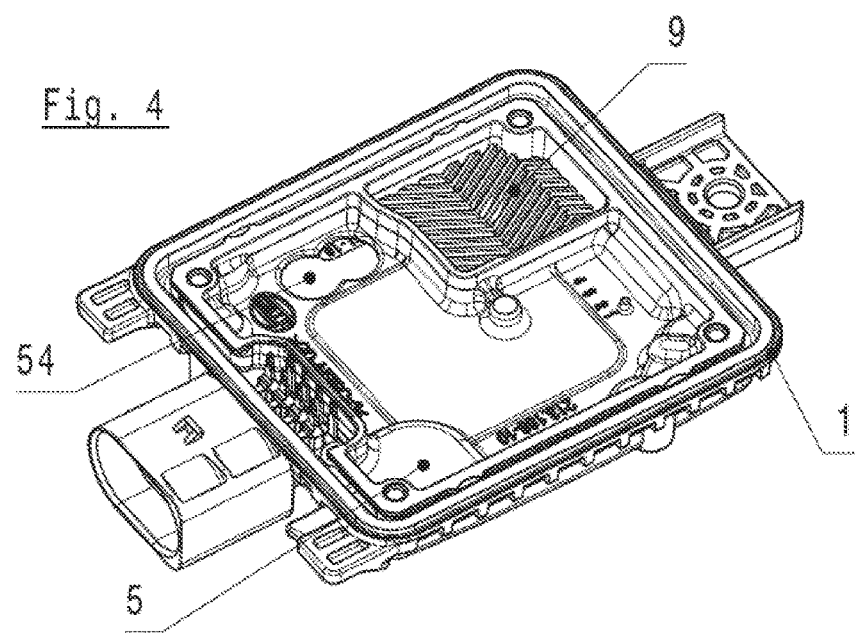
FIG. 4 is the lower part of the housing, the shield and the absorbing body for the radar device.
Figure 5:
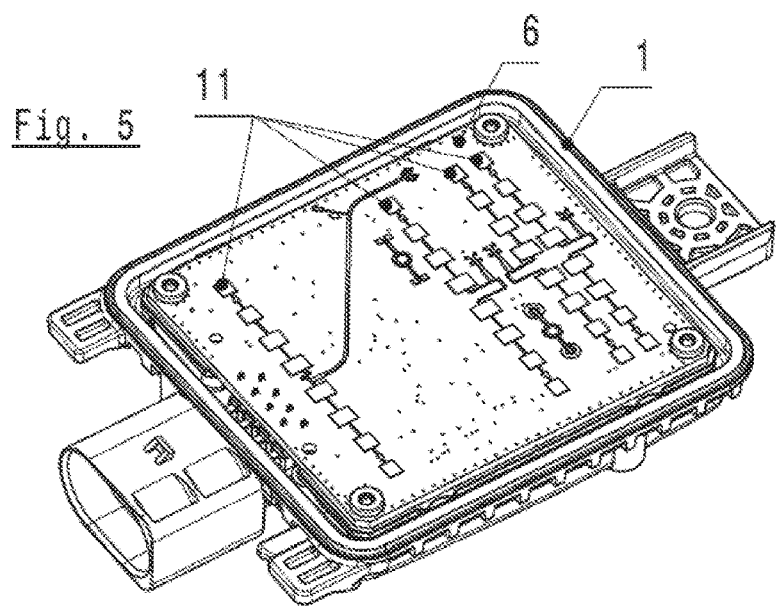
FIG. 5 is the lower part of the housing, the interconnect device and antennas for the radar device.
Figure 6:
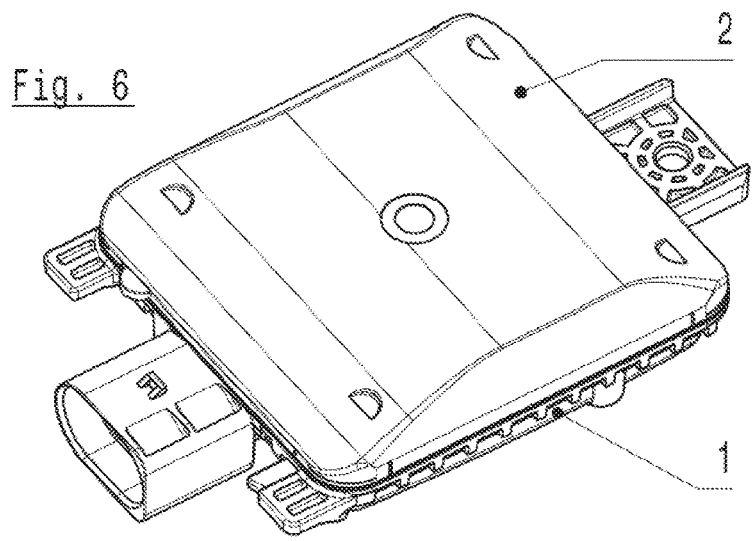
FIG. 6 illustrates the entire radar device.
Figure 7:
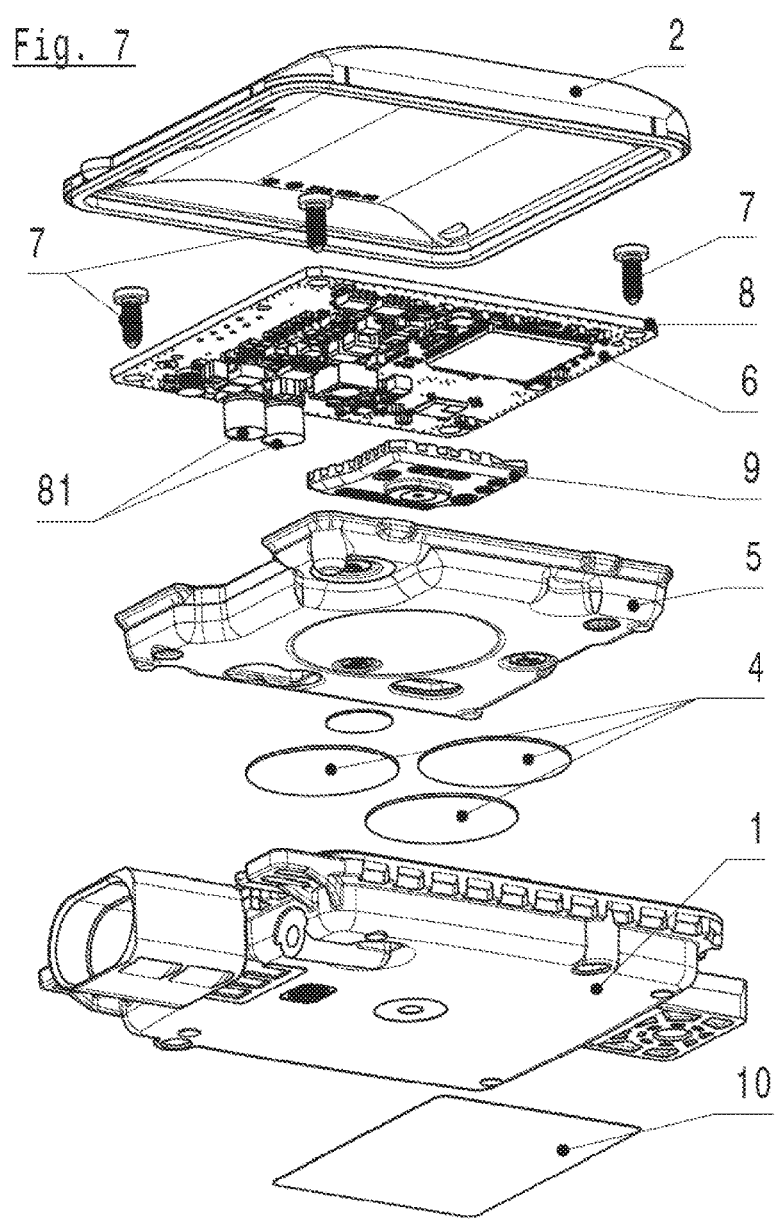
FIG. 7 is a first exploded drawing of the entire radar device.
Figure 8:
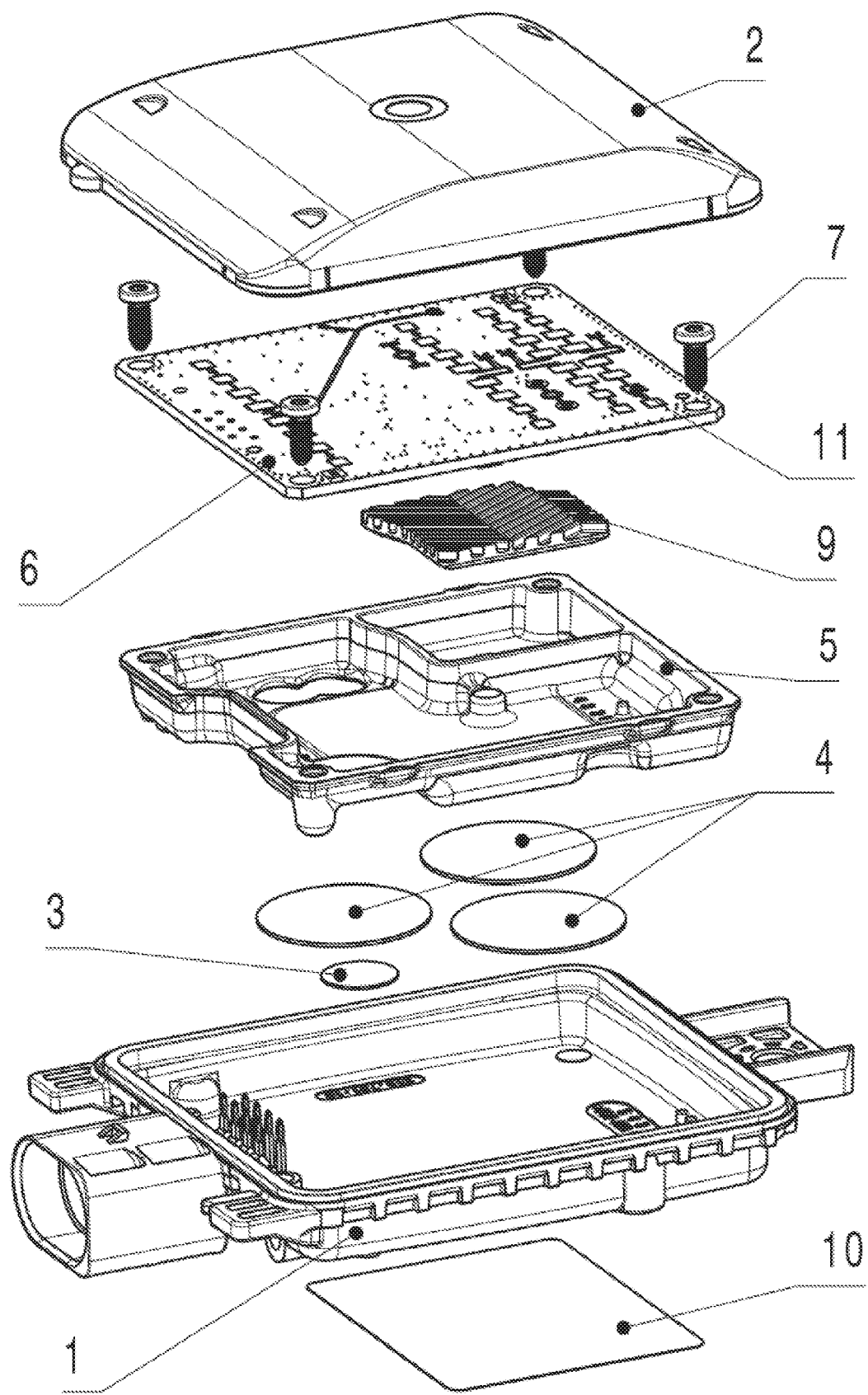
FIG. 8 is a second exploded drawing of the entire radar device

The inventive radar device has a two-piece housing 1, 2. The housing 1, 2 has the lower part of the housing 1 with a plastic device connector (it is advantageous if this is molded on) and a radome 2 as the upper part of the housing.

The lower part of the housing 1 is provided with a hole that is sealed using a diaphragm 3. The diaphragm 3 can curve into the housing 1, 2 or out of the housing and thereby provide for pressure equalization between the housing interior and the environment of the housing 1, 2. It is also possible for the diaphragm to be permeable to air, enabling it to provide for pressure equalization. A label 10 can be attached to the outside of the lower part of the housing. It is also possible to put fins on the outside of the lower part of the housing that act as cooling fins.

For example, three bonding points 4 are used to fasten the shield 5 made of aluminum or some other metal in the lower part of the housing 1. The fastener is chosen so as to establish good heat transfer between the shield and the lower part of the housing. Heat transfer can be improved, for example, by using thermally conductive paste or gap filler. It may suffice to use an adhesive that enables good heat transfer due to its good wetting properties. The shield 5 is manufactured through die casting (die-cast aluminum).

Instead of a shield that is manufactured entirely from metal, it is also possible to use a plastic part with at least one metal layer and a plastic part with embedded metal parts or metal particles. The shield 5 is designed like a tub, so it has an interior. This interior area is partitioned by fillets 51. As a result of this partitioning of the interior space and in conjunction with the bottom side of the interconnect device 6, which is mounted on the shield 5 with screws 7, two chambers 52, 53 are formed: one for high-frequency components and one for low-frequency components. The high-frequency components and low-frequency components are arranged on a first side, in the example, on the bottom side of the interconnect device 6, form a circuit arrangement 8 and protrude into the chambers 52, 53. Chamber 53 for high-frequency components not only has components protruding into it, but also has an absorbing body 9 made of radar-absorbing plastic arranged within it. It is advantageous for the absorbing body 9 to be glued to the shield 5 and/or the lower part of the housing 1. It is advantageous for the connection to be designed so as to establish good heat transfer between the absorbing body 9 and the shield 5 and/or the lower part of the housing 1.

In principle, it is possible to manufacture the lower part of the housing 1 and the shield 5 as a single part. Such a part 1, 5 could be composed of multiple components or designed as one piece, for example, as a plastic part with embedded metal particles.

The shield 5 has a hole 54 that is shaped like a figure eight. Two adjacently arranged electrolytic capacitors 81 of the circuit arrangement 8 protrude into this hole 54.

On a second side of the interconnect device 6 there are antennas 11; these are transmitter antennas and receiver antennas provided by conductor paths and other metal structures. These antennas 11 are covered by the radome 2.

REFERENCE NUMERAL LIST

1 Lower part of the housing
2 Upper part of the housing/radome
3 Diaphragm
4 Bonding points
5 Shield
51 Fillets
52 Chamber
53 Chamber
54 Hole
6 Interconnect device
7 Screws
8 Circuit arrangement
81 Electrolytic capacitors
9 Absorbing body
10 Label
11 Antennas

The invention claimed is:

1. A radar device comprising:
   a lower housing;
   a radome coupled to the lower housing;
   a shield connected to the lower housing; and
   an interconnect device connected between the shield and the radome and having an electronic circuit arrangement arranged on a first side proximate to the shield and antennas arranged on a second side proximate to the radome and opposite the first side,
   where the shield and the interconnect device are surrounded by the lower housing, and, with the electronic circuit arrangement and antennas arranged on the interconnect device,
   wherein the radome closes the shield and the interconnect device inside the lower housing, and
   wherein a medium that has a thermal conductivity greater than 0.15 W/(m·K) is arranged between the shield and the lower housing.

2. The radar device in accordance with claim 1, wherein the shield is connected to the housing through gluing, welding or the use of another firmly bonded connection.

3. The radar device in accordance with claim 2, wherein the medium is an adhesive and the adhesive creates a bond between the shield and the lower portion of the housing.

4. The radar device in accordance with claim 3, wherein the adhesive is a thermally conductive adhesive.

5. The radar device in accordance with claim 3, wherein the adhesive contains at least a thermally conductive filler material.

6. The radar device in accordance with claim 1, wherein the shield is in contact with both the lower portion of the housing and other components of the radar device through the medium.

7. The radar device in accordance with claim 1, wherein a part of the lower portion of the housing, which is in contact with the shield structure through the medium, is manufactured entirely or partially of plastic, where the plastic contains a material that has a thermal conductivity greater than a thermal conductivity of other materials contained in the plastic.

8. The radar device in accordance with claim 1, wherein the housing features cooling fins.

9. The radar device in accordance with claim 1, wherein the shield is a plastic part with embedded metal particles having a thermal conductivity greater than the plastic has.

10. The radar device in accordance with claim 1, wherein the housing or a part of the housing and the shield structure are a single piece.

11. The radar device in accordance with claim 10, wherein the single piece is a plastic part with external metalization, with a metal core and/or with embedded particles, such as metal particles, with a thermal conductivity greater than the plastic.

12. The radar device in accordance with claim 1, wherein the shield has at least one hole into or through which at least one component of the electronic circuit arrangement protrudes, while remaining components of the electronic circuit arrangement, with the exception of connecting elements, are arranged entirely between the first side of the interconnect device and the shield.

13. The radar device in accordance with claim 12, wherein the at least one component has a housing made of metal or at least partially made of metal.

14. The radar device in accordance with claim 13, wherein there is an electrically conducting connection between the metal of the housing of the at least one component and the shield.

15. The radar device in accordance with claim 13, wherein there is an electrically conducting connection in the form of a ground potential between the metal of the housing of the at least one component and the shield.

* * * * *